(12) United States Patent
Schreiber et al.

(10) Patent No.: US 10,209,013 B2
(45) Date of Patent: Feb. 19, 2019

(54) VAPOR COMPRESSION SYSTEM

(71) Applicant: JOHNSON CONTROLS TECHNOLOGY COMPANY, Holland, MI (US)

(72) Inventors: Jeb W Schreiber, Emigsville, PA (US); Justin P Kauffman, York, PA (US); Michel Oskamroux, York, PA (US)

(73) Assignee: Johnson Controls Technology Company, Holland, MI (US)

(*) Notice: Subject to any disclaimer, the term of this patent is extended or adjusted under 35 U.S.C. 154(b) by 1028 days.

(21) Appl. No.: 13/912,634

(22) Filed: Jun. 7, 2013

(65) Prior Publication Data

US 2013/0269916 A1 Oct. 17, 2013

Related U.S. Application Data

(63) Continuation-in-part of application No. 12/875,748, filed on Sep. 3, 2010, now abandoned.

(51) Int. Cl.
*F28F 9/00* (2006.01)
*F25B 39/02* (2006.01)
(Continued)

(52) U.S. Cl.
CPC ............ *F28F 9/005* (2013.01); *F25B 39/028* (2013.01); *F28D 3/04* (2013.01); *F28D 5/02* (2013.01);
(Continued)

(58) Field of Classification Search
CPC ...... F25B 2339/0241; F25B 2339/0242; F25B 2339/021; F25B 2339/04; F25B 39/028; F28F 2215/10; F28F 25/06; F28F 25/04; F28F 25/082; F28F 25/085; B05B 1/046; B05B 1/044; B05B 1/048; B05B 1/042
See application file for complete search history.

(56) References Cited

U.S. PATENT DOCUMENTS

| 939,143 A | 11/1909 | Lillie |
| 1,732,963 A | 10/1929 | Burhorn |

(Continued)

FOREIGN PATENT DOCUMENTS

| CA | 1064815 A | 10/1979 |
| CN | 101050899 A | 10/2007 |

(Continued)

OTHER PUBLICATIONS

Witt, "Spray Evaporator—Assembly and Instructions for the BVKF Models", Nov. 1, 1998, pp. 1-11, Figures p. 2.
(Continued)

*Primary Examiner* — Jon T. Schermerhorn, Jr.
(74) *Attorney, Agent, or Firm* — Fletcher Yoder, P.C.

(57) ABSTRACT

A distributor for use in a vapor compression system includes an enclosure configured to be positioned in a heat exchanger having a tube bundle including a plurality of tubes extending substantially horizontally in the heat exchanger. At least one distribution device formed in an end of the enclosure positioned to face the tube bundle, the at least one distribution device configured to apply a fluid entering the distributor onto the tube bundle. The enclosure has an aspect ratio between about ½:1 and about 10:1.

11 Claims, 13 Drawing Sheets

(51) Int. Cl.
*F28D 3/04* (2006.01)
*F28D 5/02* (2006.01)
*F28F 9/02* (2006.01)
F28D 3/02 (2006.01)
F28D 7/16 (2006.01)
F28D 21/00 (2006.01)
F28F 25/06 (2006.01)

(52) U.S. Cl.
CPC ........ *F25B 2339/0242* (2013.01); *F28D 3/02* (2013.01); *F28D 7/16* (2013.01); *F28D 21/0017* (2013.01); *F28D 2021/0047* (2013.01); *F28D 2021/0071* (2013.01); *F28F 9/0273* (2013.01); *F28F 25/06* (2013.01)

(56) References Cited

U.S. PATENT DOCUMENTS

| | | | |
|---|---|---|---|
| 1,944,056 A | 1/1934 | Baer | |
| 2,012,183 A | 8/1935 | Carrier | |
| 2,047,465 A | 7/1936 | Ford | |
| 2,059,725 A | 11/1936 | Carrier | |
| 2,091,757 A | 8/1937 | Hanny | |
| 2,274,391 A | 2/1942 | Zwicki | |
| 2,323,511 A | 7/1943 | Baker | |
| 2,384,413 A | 9/1945 | Zwicki | |
| 2,411,097 A | 11/1946 | Kopp | |
| 2,492,725 A | 12/1949 | Ashley | |
| 3,004,396 A | 10/1961 | Endress et al. | |
| 3,095,255 A | 6/1963 | Smith | |
| 3,132,064 A | 5/1964 | Scheffers | |
| 3,180,408 A | 4/1965 | Grotz, Jr. et al. | |
| 3,191,396 A | 6/1965 | Ruddock | |
| 3,197,387 A | 7/1965 | Lawrance | |
| 3,213,935 A | 10/1965 | Reid, Jr. | |
| 3,240,265 A | 3/1966 | Weller | |
| 3,259,181 A | 7/1966 | Ashley et al. | |
| 3,267,693 A | 8/1966 | Richardson et al. | |
| 3,276,217 A | 10/1966 | Bourne et al. | |
| 3,290,025 A | 12/1966 | Engalitcheff, Jr. | |
| 3,326,280 A | 6/1967 | Bosquain et al. | |
| 3,351,119 A | 11/1967 | Rosenblad | |
| 3,412,569 A | 11/1968 | Arledge, Jr. | |
| 3,412,778 A | 11/1968 | Witt et al. | |
| 3,584,786 A * | 6/1971 | Johnson ............ B05B 1/04 239/568 | |
| 3,635,040 A | 1/1972 | Morris, Jr. | |
| 3,735,811 A | 5/1973 | Moser et al. | |
| 3,775,993 A | 12/1973 | Murphy | |
| 3,831,390 A | 8/1974 | Hopkins | |
| 3,849,232 A | 11/1974 | Kessler et al. | |
| 4,154,642 A | 5/1979 | Mattern et al. | |
| 4,158,295 A | 6/1979 | Sibley | |
| 4,324,108 A * | 4/1982 | Billett ............ A23G 7/02 62/345 | |
| 4,437,322 A | 3/1984 | Ertinger | |
| 4,511,432 A | 4/1985 | Sephton | |
| 4,520,866 A | 6/1985 | Nakajima et al. | |
| 4,557,877 A | 12/1985 | Hofstetter | |
| 4,706,741 A | 11/1987 | Bolmstedt et al. | |
| 4,918,944 A | 4/1990 | Takahashi et al. | |
| 4,944,839 A | 7/1990 | Rosenblad | |
| 4,972,903 A | 11/1990 | Kwok | |
| 4,977,861 A | 12/1990 | Charbonnel et al. | |
| 5,044,427 A | 9/1991 | Love et al. | |
| 5,059,226 A | 10/1991 | Schneider et al. | |
| 5,086,621 A | 2/1992 | Starner et al. | |
| 5,246,541 A | 9/1993 | Ryham | |
| 5,419,155 A | 5/1995 | Boehde et al. | |
| 5,461,883 A | 10/1995 | Terasaki | |
| 5,481,887 A | 1/1996 | Terasaki | |
| 5,561,987 A * | 10/1996 | Hartfield ............ B01D 1/04 165/117 | |
| 5,575,889 A | 11/1996 | Rosenbald | |
| 5,588,596 A | 12/1996 | Hartfield et al. | |
| 5,638,691 A | 6/1997 | Hartfield et al. | |
| 5,645,124 A | 7/1997 | Hartfield et al. | |
| 5,791,404 A | 8/1998 | Bailey et al. | |
| 5,795,446 A * | 8/1998 | Kirschmann ........ B01D 1/065 159/13.1 | |
| 5,809,794 A | 9/1998 | Sibik et al. | |
| 5,836,382 A | 11/1998 | Dingle et al. | |
| 5,839,294 A | 11/1998 | Chiang et al. | |
| 5,849,148 A | 12/1998 | Walker | |
| 5,922,903 A | 7/1999 | Pujado | |
| 5,931,020 A | 8/1999 | Nakamura | |
| 6,035,651 A | 3/2000 | Carey | |
| 6,089,312 A | 7/2000 | Biar et al. | |
| 6,127,571 A | 10/2000 | Mulvaney, III | |
| 6,167,713 B1 | 1/2001 | Hartfield et al. | |
| 6,170,286 B1 | 1/2001 | Keuper | |
| 6,233,967 B1 | 5/2001 | Seewald et al. | |
| 6,253,571 B1 | 7/2001 | Fujii et al. | |
| 6,293,112 B1 | 9/2001 | Moeykens et al. | |
| 6,341,492 B1 | 1/2002 | Carey | |
| 6,357,239 B2 | 3/2002 | Carey | |
| 6,357,254 B1 | 3/2002 | Xia | |
| 6,516,627 B2 | 2/2003 | Ring et al. | |
| 6,532,763 B1 * | 3/2003 | Gupte ............ F25B 39/02 55/434.4 | |
| 6,596,244 B1 | 7/2003 | Pujado | |
| 6,606,882 B1 | 8/2003 | Gupte | |
| 6,695,043 B1 | 2/2004 | Wagner et al. | |
| 6,742,347 B1 | 6/2004 | Kolk et al. | |
| 6,748,763 B2 | 6/2004 | Schweigert et al. | |
| 6,749,817 B1 | 6/2004 | Mulvaney, III | |
| 6,830,099 B2 | 12/2004 | Moeykens | |
| 6,830,654 B1 | 12/2004 | Salmisuo | |
| 6,868,595 B1 | 3/2005 | Dingel et al. | |
| 6,868,695 B1 | 3/2005 | Dingel et al. | |
| 8,561,675 B2 * | 10/2013 | Liu ............ F25B 39/02 165/115 | |
| 2001/0009648 A1 * | 7/2001 | Bisgrove ............ B05B 7/066 422/140 | |
| 2002/0007639 A1 | 1/2002 | Carey | |
| 2002/0137874 A1 | 9/2002 | Hucks et al. | |
| 2002/0162352 A1 | 11/2002 | Ring et al. | |
| 2003/0230105 A1 | 12/2003 | Lee | |
| 2004/0112573 A1 | 6/2004 | Moeykens | |
| 2004/0245084 A1 | 12/2004 | Bethge | |
| 2006/0080998 A1 * | 4/2006 | De Larminat ........ F25B 39/028 62/515 |
| 2008/0148767 A1 | 6/2008 | de Larminat | |
| 2009/0178790 A1 * | 7/2009 | Schreiber ............ F25B 39/028 165/158 |
| 2011/0056664 A1 | 3/2011 | de Larminat et al. | |
| 2013/0269916 A1 | 10/2013 | Schreiber et al. | |

FOREIGN PATENT DOCUMENTS

| | | |
|---|---|---|
| CN | 101482346 A | 7/2009 |
| CN | 101922882 A | 12/2010 |
| CN | 201210339474.X A | 9/2012 |
| CN | 103673420 B | 3/2016 |
| EP | 0179225 A | 4/1986 |
| EP | 1030154 A2 | 8/2000 |
| GB | 769459 A | 3/1957 |
| GB | 1033187 A | 6/1966 |
| GB | 2161256 A | 1/1986 |
| JP | 50-73252 | 10/1975 |
| JP | 56-90957 | 7/1981 |
| JP | 5752768 A | 3/1982 |
| JP | 58-26955 | 2/1983 |
| WO | 9905463 A1 | 2/1999 |
| WO | 2006044448 A2 | 4/2006 |
| WO | 2009111025 A2 | 9/2009 |

OTHER PUBLICATIONS

J. Roques, et al., "Falling Film Transitions on Plain and Enhanced Tubes", Journal of Heat Transfer, ASME Jun. 2002, vol. 124, pp. 491-499.

(56) References Cited

OTHER PUBLICATIONS

Chinese Office Action for CN Application No. 201380077235.4 dated Nov. 23, 2016; 10 Pages.
Japanese Office Action for JP Application No. 2016-518312 dated Nov. 25, 2016; 8 Pages.

* cited by examiner

VAPOR COMPRESSION SYSTEM

CROSS-REFERENCE TO RELATED APPLICATIONS

This application claims priority from and the benefit of U.S. Nonprovisional application Ser. No. 12/875,748, entitled VAPOR COMPRESSION SYSTEM, filed Sep. 3, 2010, which is hereby incorporated by reference.

BACKGROUND

The application relates generally to vapor compression systems in refrigeration, air conditioning and chilled liquid systems. The application relates more specifically to distribution systems and methods in vapor compression systems.

Conventional chilled liquid systems used in heating, ventilation and air conditioning systems include an evaporator to effect a transfer of thermal energy between the refrigerant of the system and another liquid to be cooled. One type of evaporator includes a shell with a plurality of tubes forming a tube bundle(s) through which the liquid to be cooled is circulated. The refrigerant is brought into contact with the outer or exterior surfaces of the tube bundle inside the shell, resulting in a transfer of thermal energy between the liquid to be cooled and the refrigerant. For example, refrigerant can be deposited onto the exterior surfaces of the tube bundle by spraying or other similar techniques in what is commonly referred to as a "falling film" evaporator. In a further example, the exterior surfaces of the tube bundle can be fully or partially immersed in liquid refrigerant in what is commonly referred to as a "flooded" evaporator. In yet another example, a portion of the tube bundle can have refrigerant deposited on the exterior surfaces and another portion of the tube bundle can be immersed in liquid refrigerant in what is commonly referred to as a "hybrid falling film" evaporator.

As a result of the thermal energy transfer with the liquid, the refrigerant is heated and converted to a vapor state, which is then returned to a compressor where the vapor is compressed, to begin another refrigerant cycle. The cooled liquid can be circulated to a plurality of heat exchangers located throughout a building. Warmer air from the building is passed over the heat exchangers where the cooled liquid is warmed, while cooling the air for the building. The liquid warmed by the building air is returned to the evaporator to repeat the process.

SUMMARY

The present invention relates to a distributor for use in a vapor compression system including an enclosure configured to be positioned in a heat exchanger having a tube bundle having a plurality of tubes extending substantially horizontally in the heat exchanger. At least one distribution device is formed in an end of the enclosure positioned to face the tube bundle, the at least one distribution device configured to apply a fluid entering the distributor onto the tube bundle. The enclosure has an aspect ratio between about ½:1 and about 10:1.

The present invention further relates to a distributor for use in a vapor compression system, including an enclosure configured to be positioned in a heat exchanger having a tube bundle comprising a plurality of tubes extending substantially horizontally in the heat exchanger. At least one distribution device is formed in an end of the enclosure positioned to face the tube bundle, the at least one distribution device configured to apply a fluid entering the distributor onto the tube bundle. The Enclosure has an aspect ratio between about ½:1 and about 10:1. The end of the enclosure includes an end feature and the at least one distribution device includes at least one opening formed in the end feature. The at least one opening is configured and disposed to distribute fluid at a spray angle of between about 60 degrees and about 180 degrees over substantially an entire range of fluid pressures associated with operation of the distributor of the system.

The present invention yet further relates to a method of distributing fluid in a vapor compression system. The method includes providing an enclosure configured to be positioned in a heat exchanger having a tube bundle comprising a plurality of tubes extending substantially horizontally in the heat exchanger. The method includes forming at least one distribution device in an end of the enclosure positioned to face the tube bundle, the at least one distribution device configured to apply a fluid entering the distributor onto the tube bundle. The enclosure has an aspect ratio between about ½:1 and about 10:1. The method includes operating the vapor compression system.

DETAILED DESCRIPTION OF THE EXEMPLARY EMBODIMENTS

Figure 1:
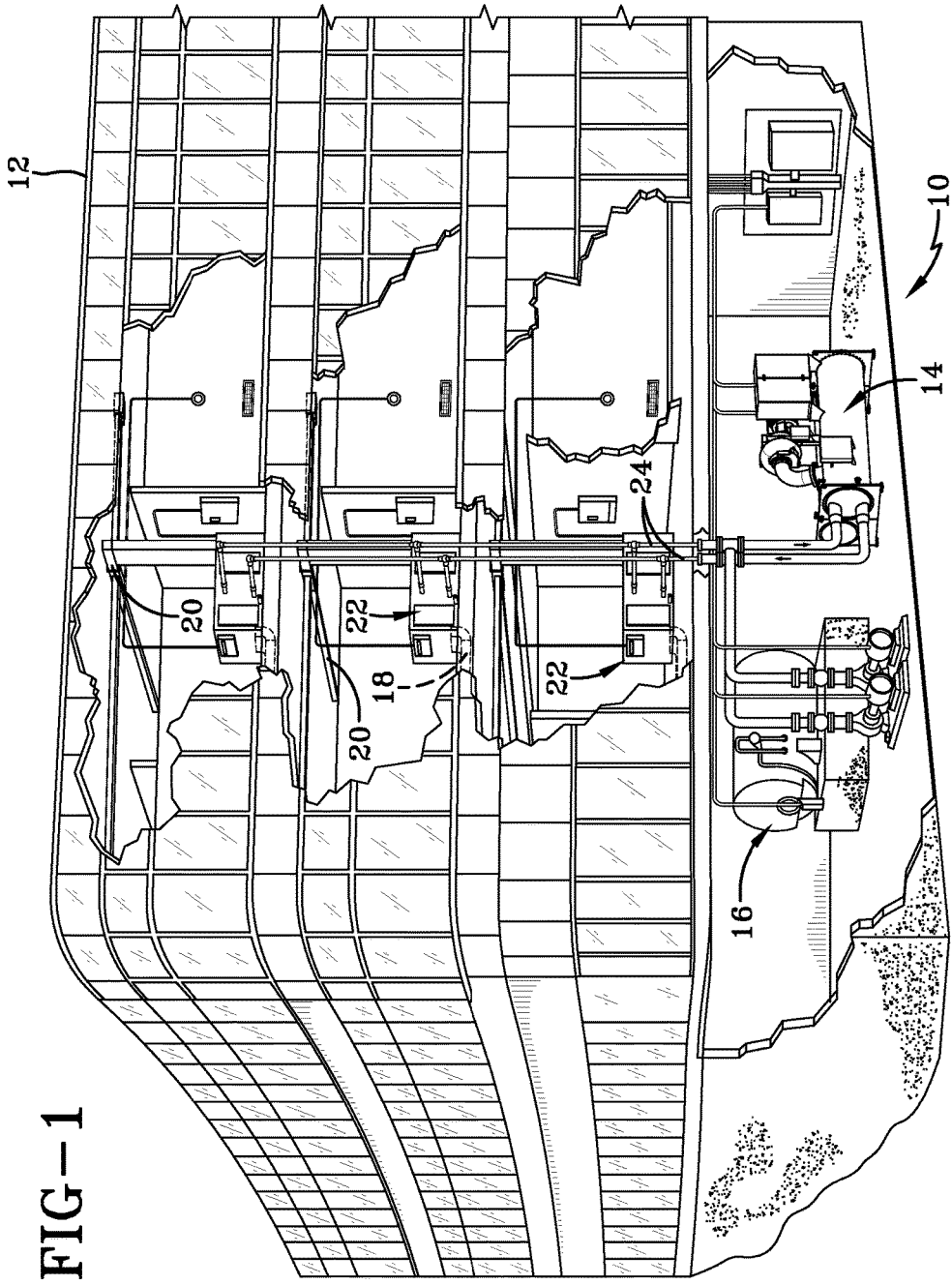
FIG. 1 shows an exemplary embodiment for a heating, ventilation and air conditioning system.

FIG. 1 shows an exemplary environment for a heating, ventilation and air conditioning (HVAC) system 10 incorporating a chilled liquid system in a building 12 for a typical commercial setting. System 10 can include a vapor compression system 14 that can supply a chilled liquid which may be used to cool building 12. System 10 can include a boiler 16 to supply heated liquid that may be used to heat building 12, and an air distribution system which circulates air through building 12. The air distribution system can also include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
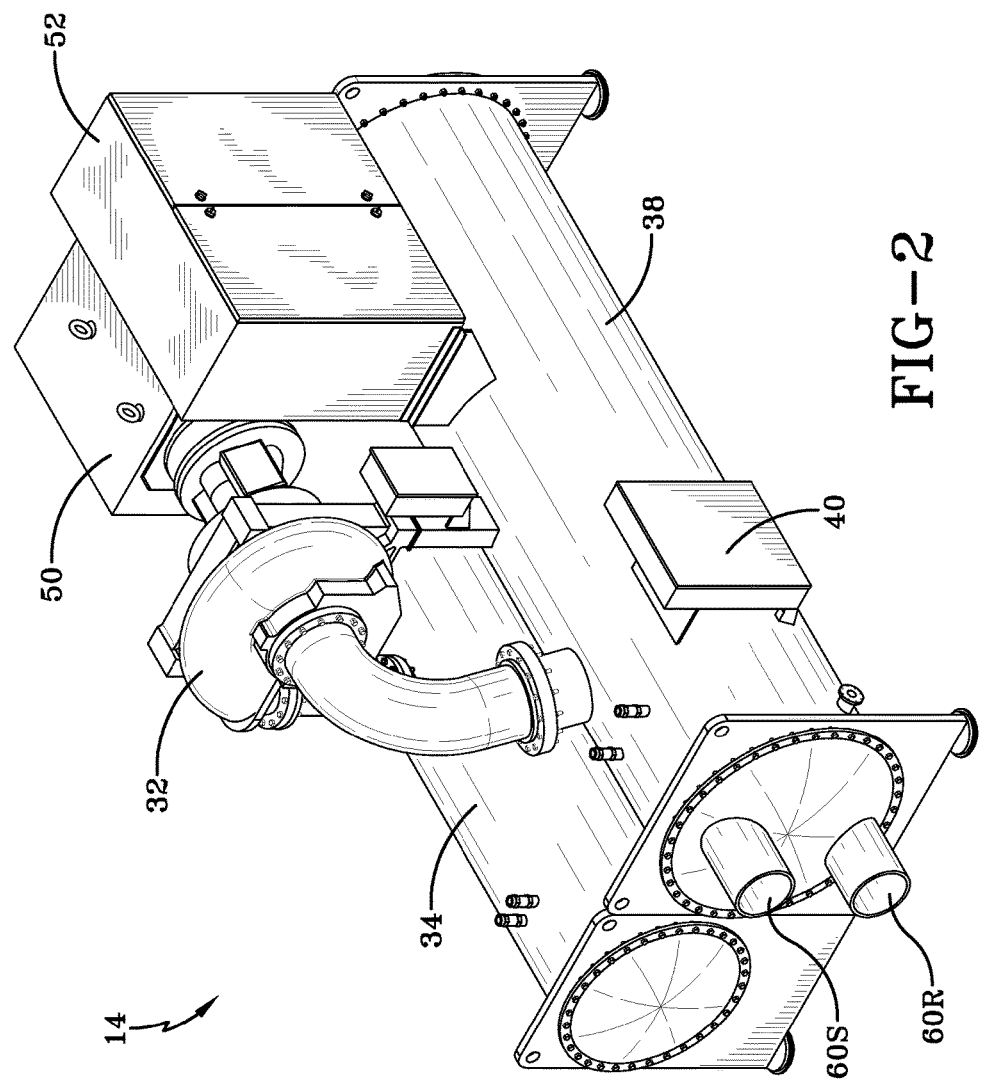
FIG. 2 shows an isometric view of an exemplary vapor compression system.
Figure 3:
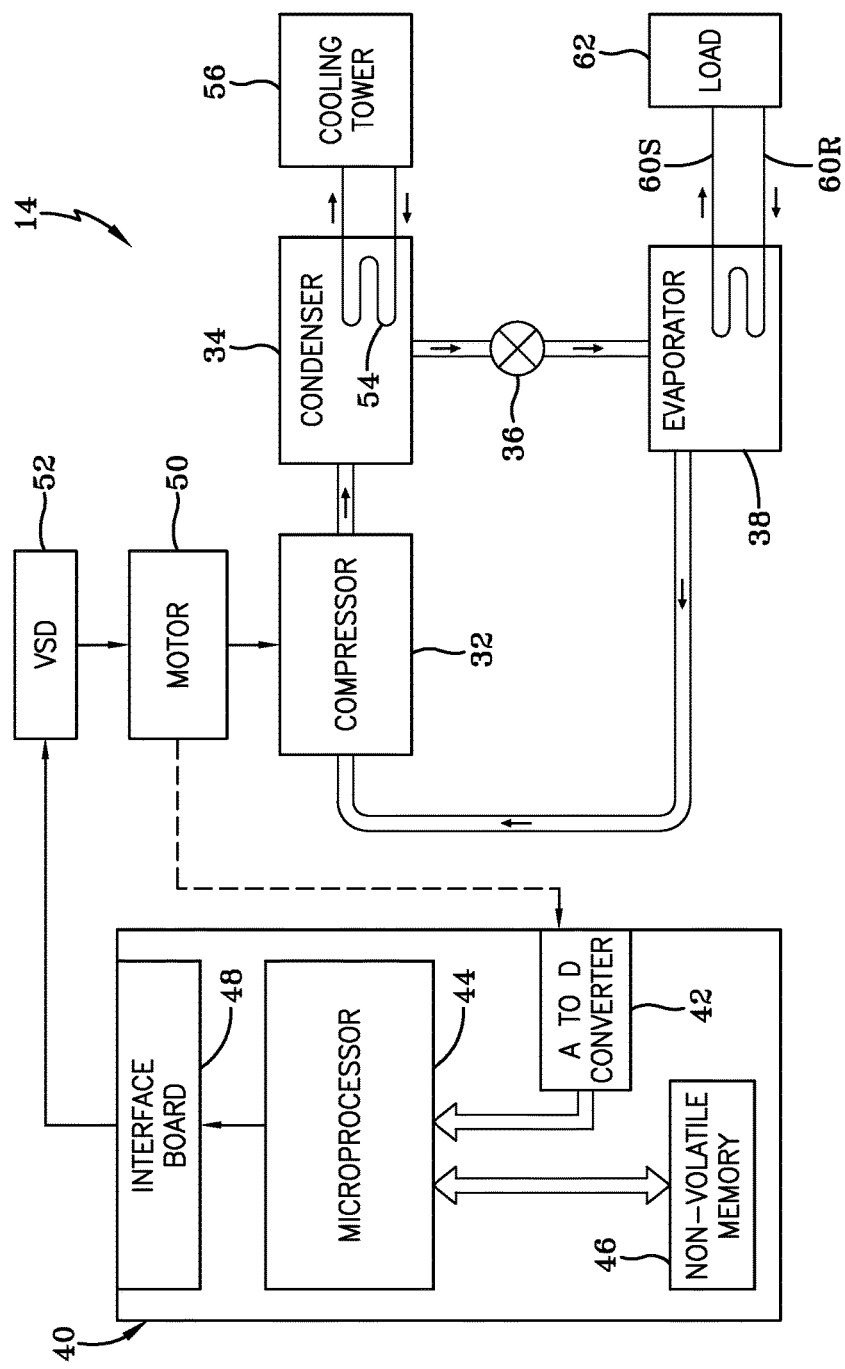
FIGS. 3 and 4 schematically illustrate exemplary embodiments of the vapor compression system.

FIGS. 2 and 3 show an exemplary vapor compression system 14 that can be used in an HVAC system, such as HVAC system 10. Vapor compression system 14 can circulate a refrigerant through a compressor 32 driven by a motor 50, a condenser 34, expansion device(s) 36, and a liquid chiller or evaporator 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are hydrofluorocarbon (HFC) based refrigerants, for example, R-410A, R-407, R-134a, hydrofluoro olefin (HFO), "natural" refrigerants like ammonia (NH3), R-717, carbon dioxide (CO2), R-744, or hydrocarbon based refrigerants, water vapor or any other suitable type of refrigerant. In an exemplary embodiment, vapor compression system 14 may use one or more of each of VSDs 52, motors 50, compressors 32, condensers 34 and/or evaporators 38.

Motor 50 used with compressor 32 can be powered by a variable speed drive (VSD) 52 or can be powered directly from an alternating current (AC) or direct current (DC) power source. VSD 52, if used, receives AC power having a particular fixed line voltage and fixed line frequency from the AC power source and provides power having a variable voltage and frequency to motor 50. Motor 50 can include any type of electric motor that can be powered by a VSD or directly from an AC or DC power source. For example, motor 50 can be a switched reluctance motor, an induction motor, an electronically commutated permanent magnet motor or any other suitable motor type. In an alternate exemplary embodiment, other drive mechanisms such as steam or gas turbines or engines and associated components can be used to drive compressor 32.

Compressor 32 compresses a refrigerant vapor and delivers the vapor to condenser 34 through a discharge line. Compressor 32 can be a centrifugal compressor, screw compressor, reciprocating compressor, rotary compressor, swing link compressor, scroll compressor, turbine compressor, or any other suitable compressor. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle having a supply line 60S and a return line 60R connected to a cooling load 62. A process fluid, for example, water, ethylene glycol, calcium chloride brine, sodium chloride brine, or any other suitable liquid, enters evaporator 38 via return line 60R and exits evaporator 38 via supply line 60S. Evaporator 38 chills the temperature of the process fluid in the tubes. The tube bundle in evaporator 38 can include a plurality of tubes and a plurality of tube bundles. The vapor refrigerant exits evaporator 38 and returns to compressor 32 by a suction line to complete the cycle.

Figure 4:
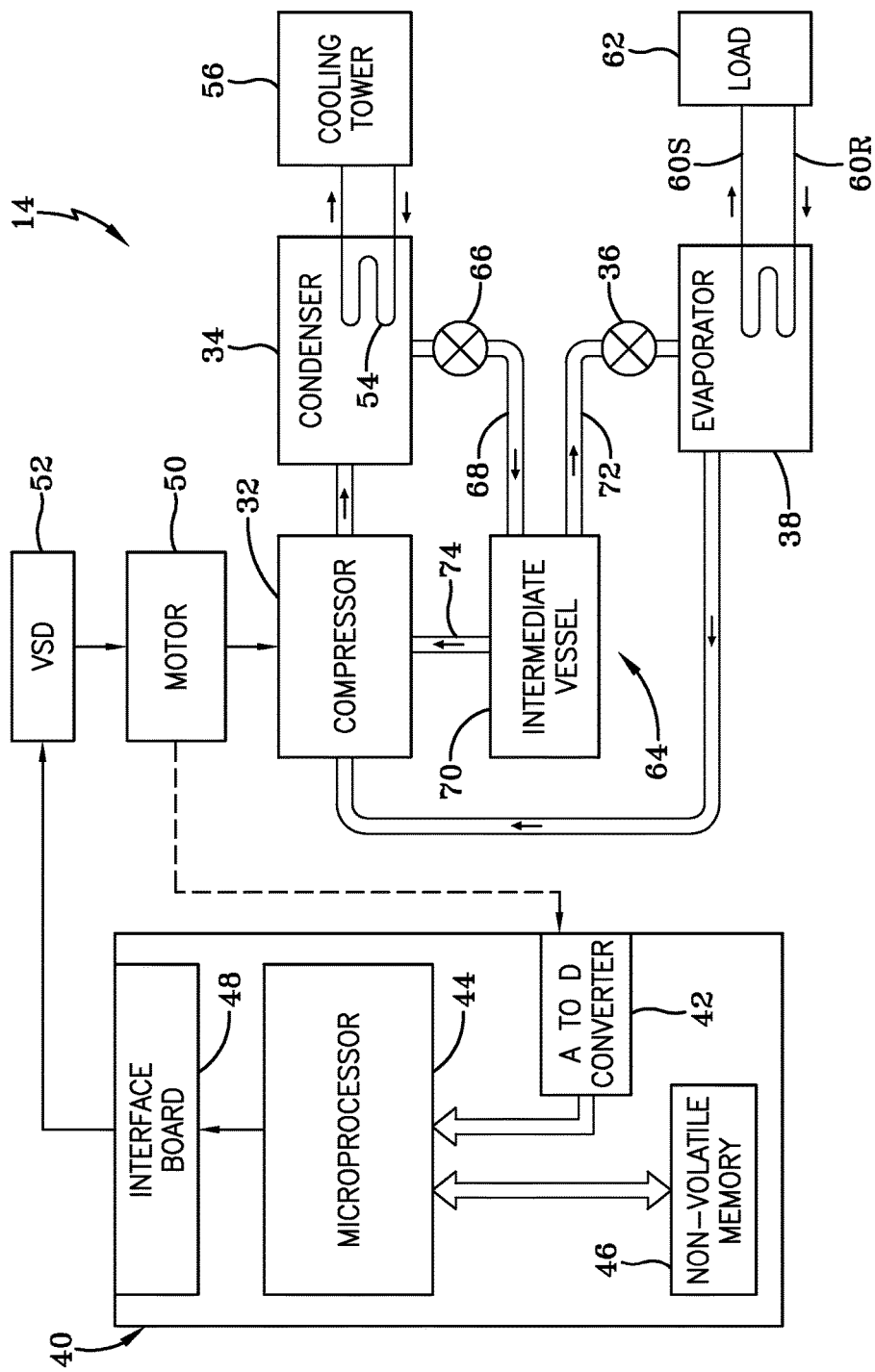

FIG. 4, which is similar to FIG. 3, shows the refrigerant circuit with an intermediate circuit 64 that may be incorporated between condenser 34 and expansion device 36 to provide increased cooling capacity, efficiency and performance. Intermediate circuit 64 has an inlet line 68 that can be either connected directly to or can be in fluid communication with condenser 34. As shown, inlet line 68 includes an expansion device 66 positioned upstream of an intermediate vessel 70. Intermediate vessel 70 can be a flash tank, also referred to as a flash intercooler, in an exemplary embodiment. In an alternate exemplary embodiment, intermediate vessel 70 can be configured as a heat exchanger or a "surface economizer." In the flash intercooler arrangement, a first expansion device 66 operates to lower the pressure of the liquid received from condenser 34. During the expansion process in a flash intercooler, a portion of the liquid is evaporated. Intermediate vessel 70 may be used to separate the evaporated vapor from the liquid received from the condenser. The evaporated liquid may be drawn by compressor 32 to a port at a pressure intermediate between suction and discharge or at an intermediate stage of compression, through a line 74. The liquid that is not evaporated is cooled by the expansion process, and collects at the bottom of intermediate vessel 70, where the liquid is recovered to flow to the evaporator 38, through a line 72 comprising a second expansion device 36.

In the "surface intercooler" arrangement, the implementation is slightly different, as known to those skilled in the art. Intermediate circuit 64 can operate in a similar matter to that described above, except that instead of receiving the entire amount of refrigerant from condenser 34, as shown in FIG. 4, intermediate circuit 64 receives only a portion of the refrigerant from condenser 34 and the remaining refrigerant proceeds directly to expansion device 36.

Figure 5A:
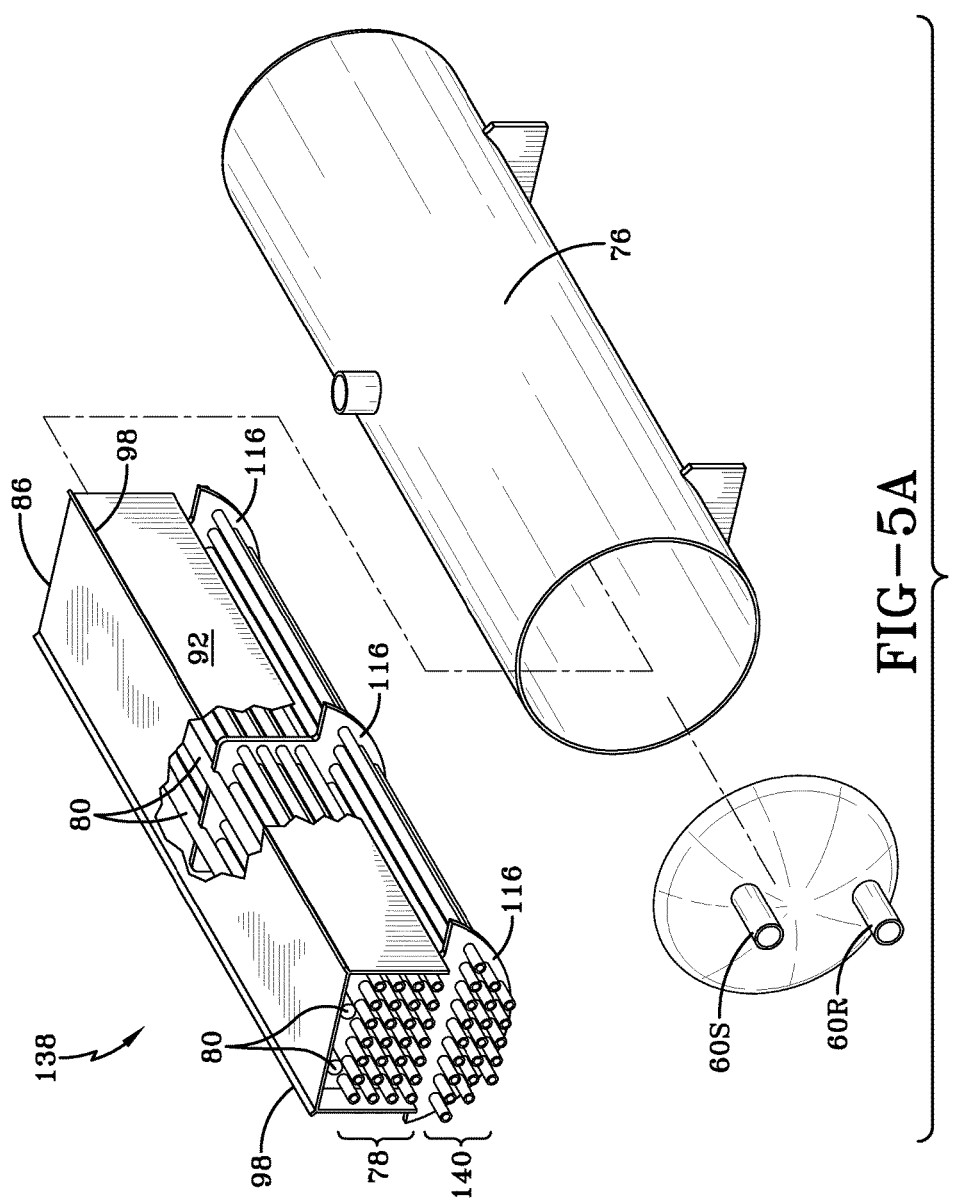
FIG. 5A shows an exploded, partial cutaway view of an exemplary evaporator.
Figure 5B:
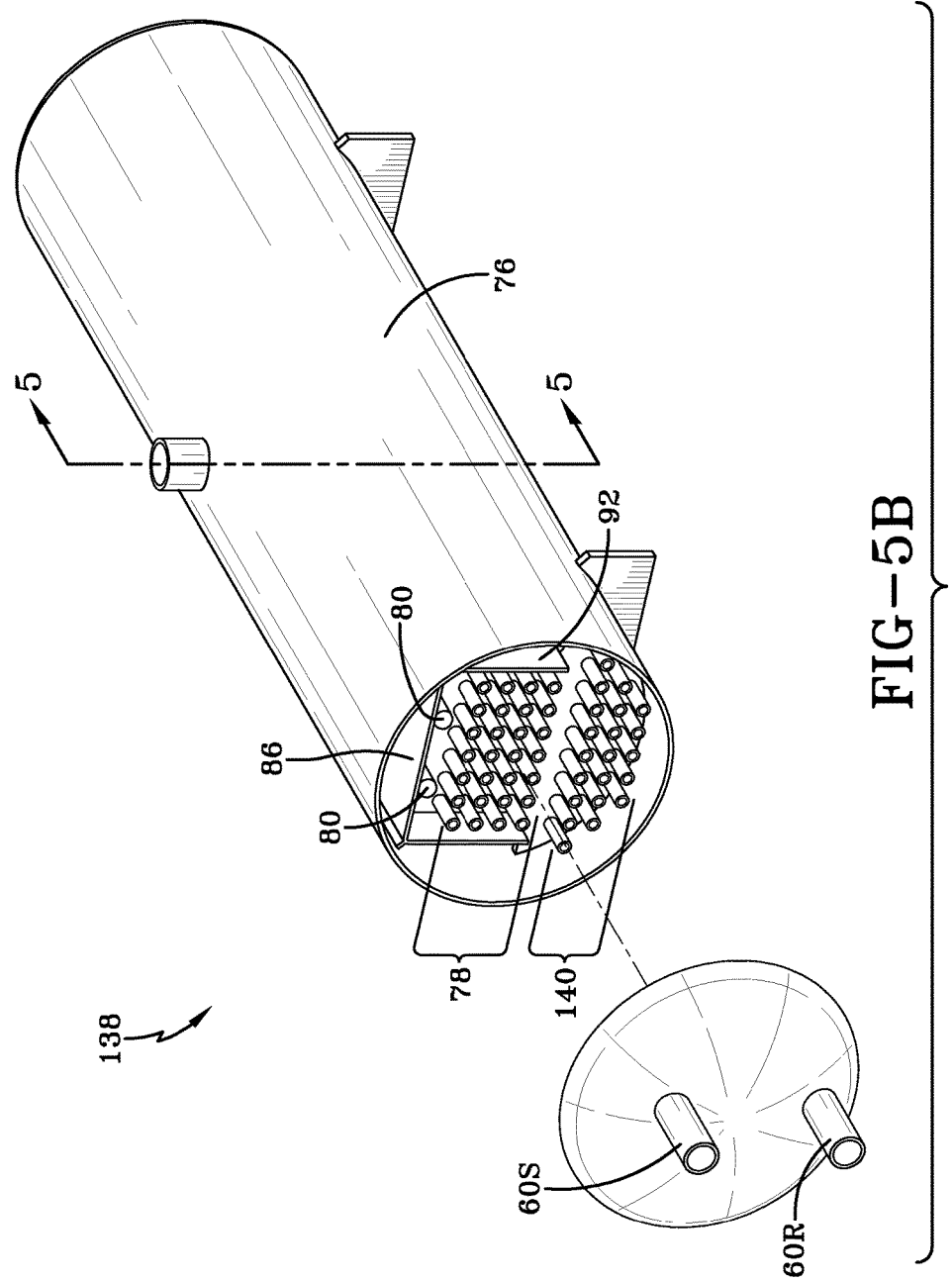
FIG. 5B shows a top isometric view of the evaporator of FIG. 5A.
Figure 5C:
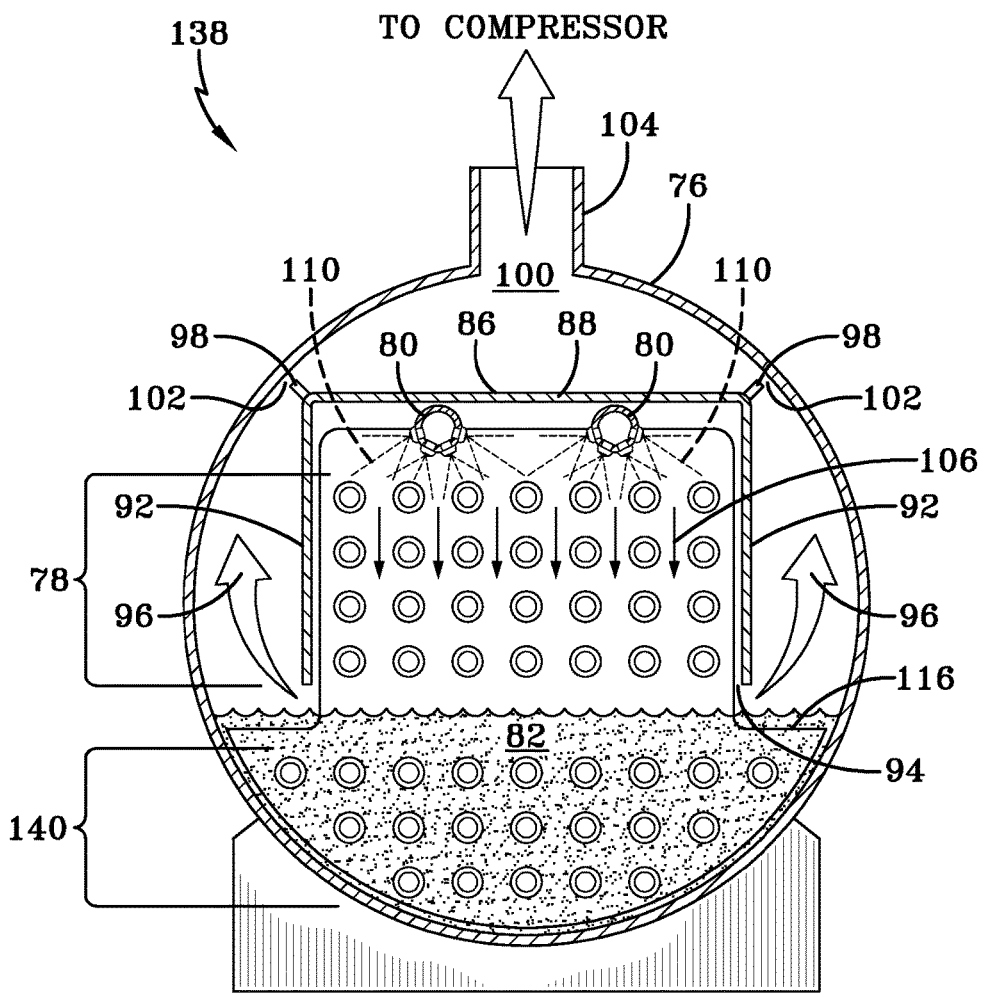
FIG. 5C shows a cross section of the evaporator taken along line 5-5 of FIG. 5B.

FIGS. 5A-5C show an exemplary embodiment of an evaporator configured as a "hybrid falling film" evaporator. As shown in FIGS. 5A-5C, an evaporator 138 includes a substantially cylindrical shell 76 with a plurality of tubes forming a tube bundle 78 extending substantially horizontally along the length of shell 76. At least one support 116 may be positioned inside shell 76 to support the plurality of tubes in tube bundle 78. A suitable fluid, such as water, ethylene, ethylene glycol, or calcium chloride brine flows through the tubes of tube bundle 78. A distributor 80 positioned above tube bundle 78 distributes, deposits or applies refrigerant 110 from a plurality of positions onto the tubes in tube bundle 78. In one exemplary embodiment, the refrigerant deposited by distributor 80 can be entirely liquid refrigerant, although in another exemplary embodiment, the refrigerant deposited by distributor 80 can include both liquid refrigerant and vapor refrigerant.

Liquid refrigerant that flows around the tubes of tube bundle 78 without changing state collects in the lower portion of shell 76. The collected liquid refrigerant can form a pool or reservoir of liquid refrigerant 82. The deposition positions from distributor 80 can include any combination of longitudinal or lateral positions with respect to tube bundle 78. In another exemplary embodiment, deposition positions from distributor 80 are not limited to ones that deposit onto the upper tubes of tube bundle 78. Distributor 80 may include a plurality of nozzles supplied by a dispersion source of the refrigerant. In an exemplary embodiment, the dispersion source is a tube connecting a source of refrigerant, such as condenser 34. Nozzles include spraying nozzles, but also include machined openings that can guide or direct refrigerant onto the surfaces of the tubes. The nozzles may apply refrigerant in a predetermined pattern, such as a jet pattern, so that the upper row of tubes of tube bundle 78 are covered. The tubes of tube bundle 78 can be arranged to promote the flow of refrigerant in the form of a film around the tube surfaces, the liquid refrigerant coalescing to form droplets or in some instances, a curtain or sheet of liquid refrigerant at the bottom of the tube surfaces. The resulting sheeting promotes wetting of the tube surfaces which enhances the heat transfer efficiency between the fluid flowing inside the tubes of tube bundle 78 and the refrigerant flowing around the surfaces of the tubes of tube bundle 78.

In the pool of liquid refrigerant 82, a tube bundle 140 can be immersed or at least partially immersed, to provide additional thermal energy transfer between the refrigerant and the process fluid to evaporate the pool of liquid refrigerant 82. In an exemplary embodiment, tube bundle 78 can be positioned at least partially above (that is, at least partially overlying) tube bundle 140. In one exemplary embodiment, evaporator 138 incorporates a two pass system, in which the process fluid that is to be cooled first flows inside the tubes of tube bundle 140 and then is directed to flow inside the tubes of tube bundle 78 in the opposite direction to the flow in tube bundle 140. In the second pass of the two pass system, the temperature of the fluid flowing in tube bundle 78 is reduced, thus requiring a lesser amount of heat transfer with the refrigerant flowing over the surfaces of tube bundle 78 to obtain a desired temperature of the process fluid.

It is to be understood that although a two pass system is described in which the first pass is associated with tube bundle 140 and the second pass is associated with tube bundle 78, other arrangements are contemplated. For example, evaporator 138 can incorporate a one pass system where the process fluid flows through both tube bundle 140 and tube bundle 78 in the same direction. Alternatively, evaporator 138 can incorporate a three pass system in which two passes are associated with tube bundle 140 and the remaining pass associated with tube bundle 78, or in which one pass is associated with tube bundle 140 and the remaining two passes are associated with tube bundle 78. Further, evaporator 138 can incorporate an alternate two pass system in which one pass is associated with both tube bundle 78 and tube bundle 140, and the second pass is associated with both tube bundle 78 and tube bundle 140. In one exemplary embodiment, tube bundle 78 is positioned at least partially above tube bundle 140, with a gap separating tube bundle 78 from tube bundle 140. In a further exemplary embodiment, hood 86 overlies tube bundle 78, with hood 86 extending toward and terminating near the gap. In summary, any number of passes in which each pass can be associated with one or both of tube bundle 78 and tube bundle 140 is contemplated.

An enclosure or hood 86 is positioned over tube bundle 78 to substantially prevent cross flow, that is, a lateral flow of vapor refrigerant or liquid and vapor refrigerant 106 between the tubes of tube bundle 78. Hood 86 is positioned over and laterally borders tubes of tube bundle 78. Hood 86 includes an upper end 88 positioned near the upper portion of shell 76. Distributor 80 can be positioned between hood 86 and tube bundle 78. In yet a further exemplary embodiment, distributor 80 may be positioned near, but exterior of, hood 86, so that distributor 80 is not positioned between hood 86 and tube bundle 78. However, even though distributor 80 is not positioned between hood 86 and tube bundle 78, the nozzles of distributor 80 are still configured to direct or apply refrigerant onto surfaces of the tubes. Upper end 88 of hood 86 is configured to substantially prevent the flow of applied refrigerant 110 and partially evaporated refrigerant, that is, liquid and/or vapor refrigerant 106 from flowing directly to outlet 104. Instead, applied refrigerant 110 and refrigerant 106 are constrained by hood 86, and, more specifically, are forced to travel downward between walls 92 before the refrigerant can exit through an open end 94 in the hood 86. Flow of vapor refrigerant 96 around hood 86 also includes evaporated refrigerant flowing away from the pool of liquid refrigerant 82.

It is to be understood that at least the above-identified, relative terms are non-limiting as to other exemplary embodiments in the disclosure. For example, hood 86 may be rotated with respect to the other evaporator components previously discussed, that is, hood 86, including walls 92, is not limited to a vertical orientation. Upon sufficient rotation of hood 86 about an axis substantially parallel to the tubes of tube bundle 78, hood 86 may no longer be considered "positioned over" nor to "laterally border" tubes of tube bundle 78. Similarly, "upper" end 88 of hood 86 may no longer be near "an upper portion" of shell 76, and other exemplary embodiments are not limited to such an arrangement between the hood and the shell. In an exemplary embodiment, hood 86 terminates after covering tube bundle 78, although in another exemplary embodiment, hood 86 further extends after covering tube bundle 78.

After hood 86 forces refrigerant 106 downward between walls 92 and through open end 94, the vapor refrigerant undergoes an abrupt change in direction before traveling in the space between shell 76 and walls 92 from the lower portion of shell 76 to the upper portion of shell 76. Combined with the effect of gravity, the abrupt directional change in flow results in a proportion of any entrained droplets of refrigerant colliding with either liquid refrigerant 82 or shell 76, thereby removing those droplets from the flow of vapor refrigerant 96. Also, refrigerant mist traveling along the length of hood 86 between walls 92 is coalesced into larger drops that are more easily separated by gravity, or maintained sufficiently near or in contact with tube bundle 78, to permit evaporation of the refrigerant mist by heat transfer with the tube bundle. As a result of the increased drop size, the efficiency of liquid separation by gravity is improved, permitting an increased upward velocity of vapor refrigerant 96 flowing through the evaporator in the space between walls 92 and shell 76. Vapor refrigerant 96, whether flowing from open end 94 or from the pool of liquid refrigerant 82, flows over a pair of extensions 98 protruding from walls 92 near upper end 88 and into a channel 100. Vapor refrigerant 96 enters into channel 100 through slots 102, which is the space between the ends of extensions 98 and shell 76, before exiting evaporator 138 at an outlet 104. In another exemplary embodiment, vapor refrigerant 96 can enter into channel 100 through openings or apertures formed in extensions 98, instead of slots 102. In yet another exemplary embodiment, slots 102 can be formed by the space between hood 86 and shell 76, that is, hood 86 does not include extensions 98.

Stated another way, once refrigerant 106 exits from hood 86, vapor refrigerant 96 then flows from the lower portion of shell 76 to the upper portion of shell 76 along the prescribed passageway. In an exemplary embodiment, the passageways can be substantially symmetric between the surfaces of hood 86 and shell 76 prior to reaching outlet 104. In an exemplary embodiment, baffles, such as extensions 98 are provided near the evaporator outlet to prevent a direct path of vapor refrigerant 96 to the compressor inlet.

In one exemplary embodiment, hood 86 includes opposed substantially parallel walls 92. In another exemplary embodiment, walls 92 can extend substantially vertically and terminate at open end 94, that is located substantially opposite upper end 88. Upper end 88 and walls 92 are closely positioned near the tubes of tube bundle 78, with walls 92 extending toward the lower portion of shell 76 so as to substantially laterally border the tubes of tube bundle 78. In an exemplary embodiment, walls 92 may be spaced between about 0.02 inch (0.5 mm) and about 0.8 inch (20 mm) from the tubes in tube bundle 78. In a further exemplary embodiment, walls 92 may be spaced between about 0.1 inch (3 mm) and about 0.2 inch (5 mm) from the tubes in tube bundle 78. However, spacing between upper end 88 and the tubes of tube bundle 78 may be significantly greater than 0.2 inch (5 mm), in order to provide sufficient spacing to position distributor 80 between the tubes and the upper end of the hood. In an exemplary embodiment in which walls 92 of hood 86 are substantially parallel and shell 76 is cylindrical, walls 92 may also be symmetric about a central vertical plane of symmetry of the shell bisecting the space separating walls 92. In other exemplary embodiments, walls 92 need not extend vertically past the lower tubes of tube bundle 78, nor do walls 92 need to be planar, as walls 92 may be curved or have other non-planar shapes. Regardless of the specific construction, hood 86 is configured to channel refrigerant 106 within the confines of walls 92 through open end 94 of hood 86.

Figure 6A:
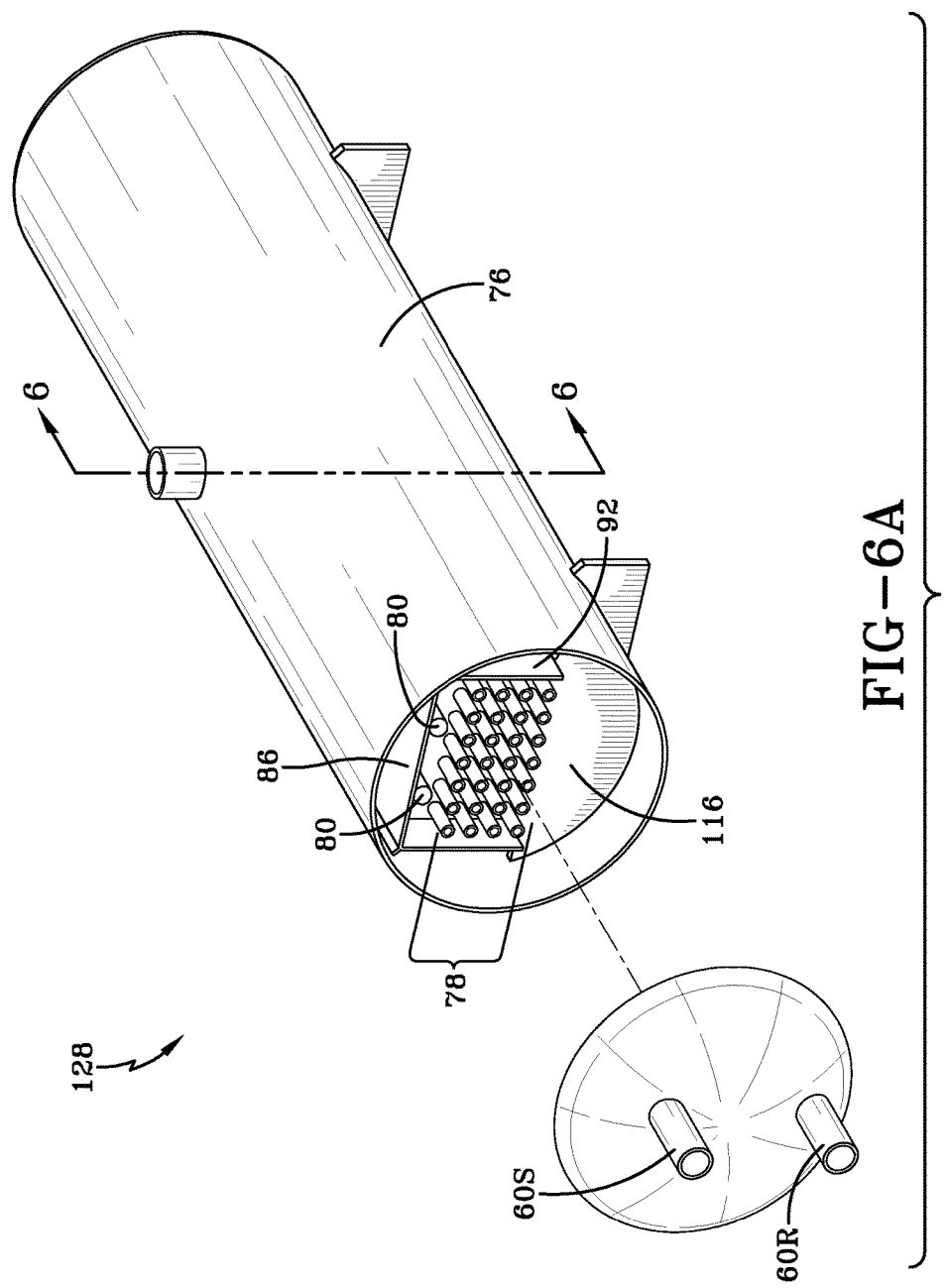
FIG. 6A shows a top isometric view of an exemplary evaporator.
Figure 6B:
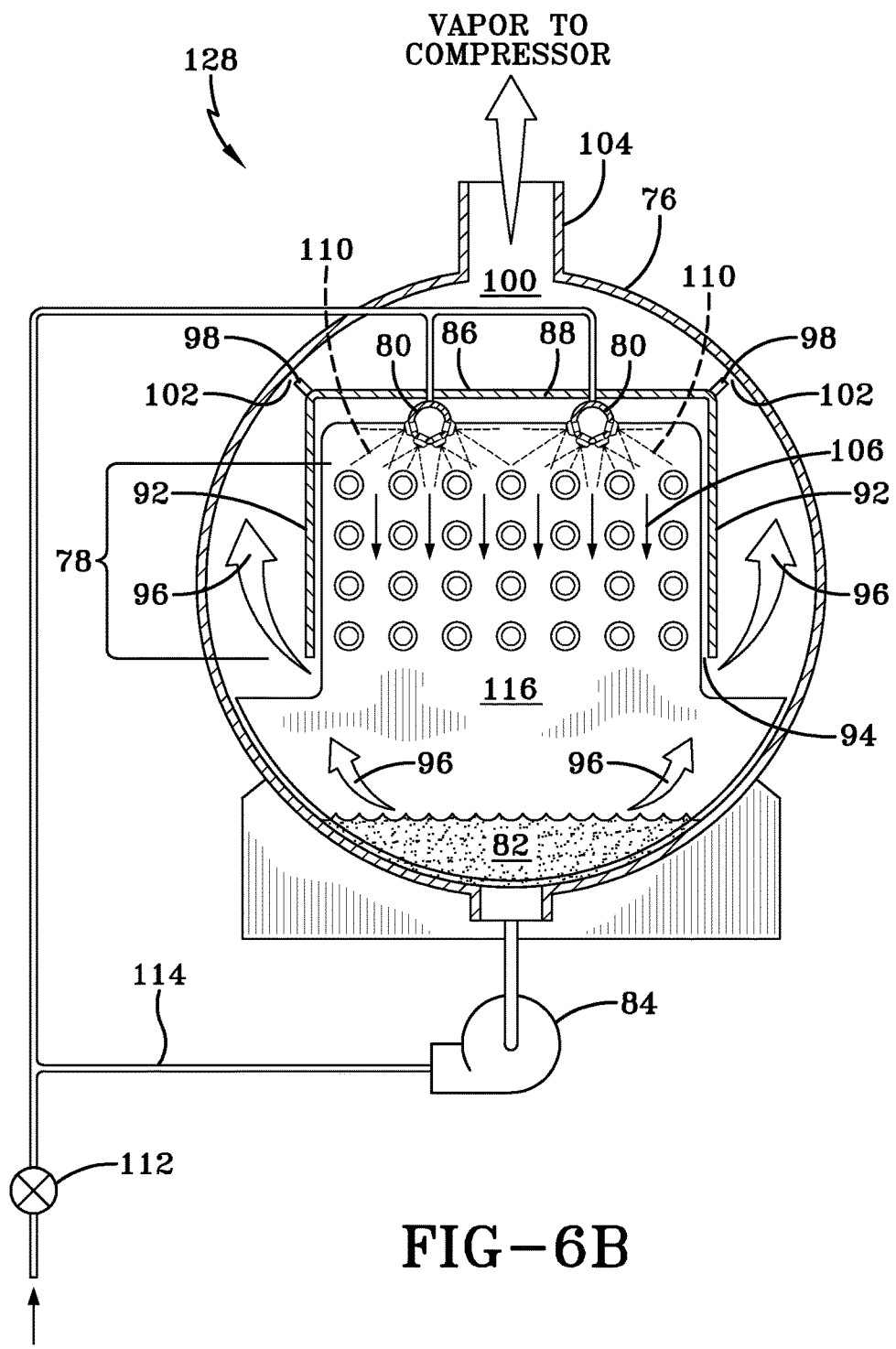
FIGS. 6B and 6C show a cross section of the evaporator taken along line 6-6 of FIG. 6A.
Figure 6C:
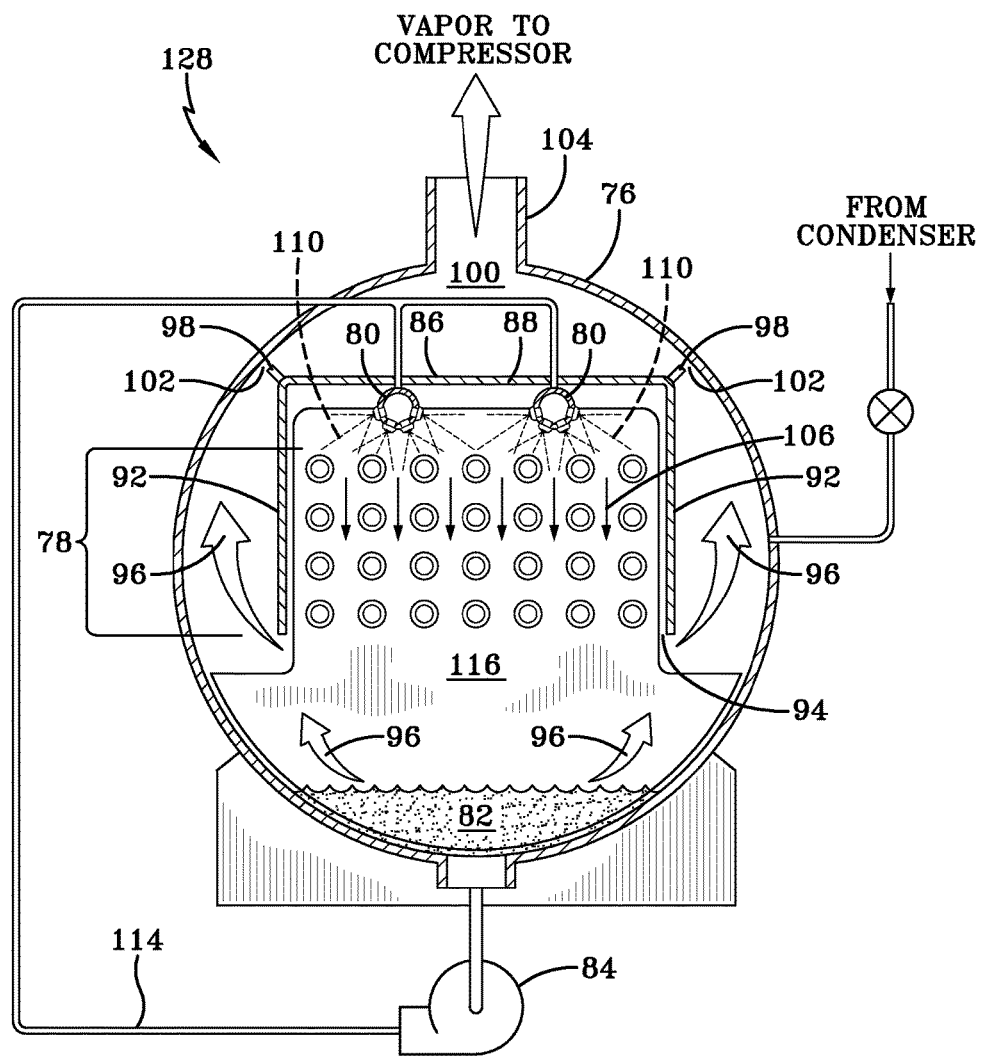

FIGS. 6A-6C show an exemplary embodiment of an evaporator configured as a "falling film" evaporator 128. As shown in FIGS. 6A-6C, evaporator 128 is similar to evaporator 138 shown in FIGS. 5A-5C, except that evaporator 128 does not include tube bundle 140 in the pool of refrigerant 82 that collects in the lower portion of the shell. In an exemplary embodiment, hood 86 terminates after covering tube bundle 78, although in another exemplary embodiment, hood 86 further extends toward pool of refrigerant 82 after covering tube bundle 78. In yet a further exemplary embodiment, hood 86 terminates so that the hood does not totally cover the tube bundle, that is, substantially covers the tube bundle.

As shown in FIGS. 6B and 6C, a pump 84 can be used to recirculate the pool of liquid refrigerant 82 from the lower portion of the shell 76 via line 114 to distributor 80. As further shown in FIG. 6B, line 114 can include a regulating device 112 that can be in fluid communication with a condenser (not shown). In another exemplary embodiment, an ejector (not shown) can be employed to draw liquid refrigerant 82 from the lower portion of shell 76 using the pressurized refrigerant from condenser 34, which operates by virtue of the Bernoulli effect. The ejector combines the functions of a regulating device 112 and a pump 84.

In an exemplary embodiment, one arrangement of tubes or tube bundles may be defined by a plurality of uniformly spaced tubes that are aligned vertically and horizontally, forming an outline that can be substantially rectangular. However, a stacking arrangement of tube bundles can be used where the tubes are neither vertically or horizontally aligned, as well as arrangements that are not uniformly spaced.

In another exemplary embodiment, different tube bundle constructions are contemplated. For example, finned tubes (not shown) can be used in a tube bundle, such as along the uppermost horizontal row or uppermost portion of the tube bundle. Besides the possibility of using finned tubes, tubes developed for more efficient operation for pool boiling applications, such as in "flooded" evaporators, may also be employed. Additionally, or in combination with the finned tubes, porous coatings can also be applied to the outer surface of the tubes of the tube bundles.

In a further exemplary embodiment, the cross-sectional profile of the evaporator shell may be non-circular.

In an exemplary embodiment, a portion of the hood may partially extend into the shell outlet.

In addition, it is possible to incorporate the expansion functionality of the expansion devices of system 14 into distributor 80. In one exemplary embodiment, two expansion devices may be employed. One expansion device is exhibited in the spraying nozzles of distributor 80. The other expansion device, for example, expansion device 36, can provide a preliminary partial expansion of refrigerant, before that provided by the spraying nozzles positioned inside the evaporator. In an exemplary embodiment, the other expansion device, that is, the non-spraying nozzle expansion device, can be controlled by the level of liquid refrigerant 82 in the evaporator to account for variations in operating conditions, such as evaporating and condensing pressures, as well as partial cooling loads. In an alternative exemplary embodiment, expansion device can be controlled by the level of liquid refrigerant in the condenser, or in a further exemplary embodiment, a "flash economizer" vessel. In one exemplary embodiment, the majority of the expansion can occur in the nozzles, providing a greater pressure difference, while simultaneously permitting the nozzles to be of reduced size, therefore reducing the size and cost of the nozzles.

This application notes other disclosure, including that of distributors, such as contained in Applicant's invention U.S. Nonprovisional application Ser. No. 12/875,748, entitled VAPOR COMPRESSION SYSTEM, filed Sep. 3, 2010, which is hereby incorporated by reference.

Figure 7:
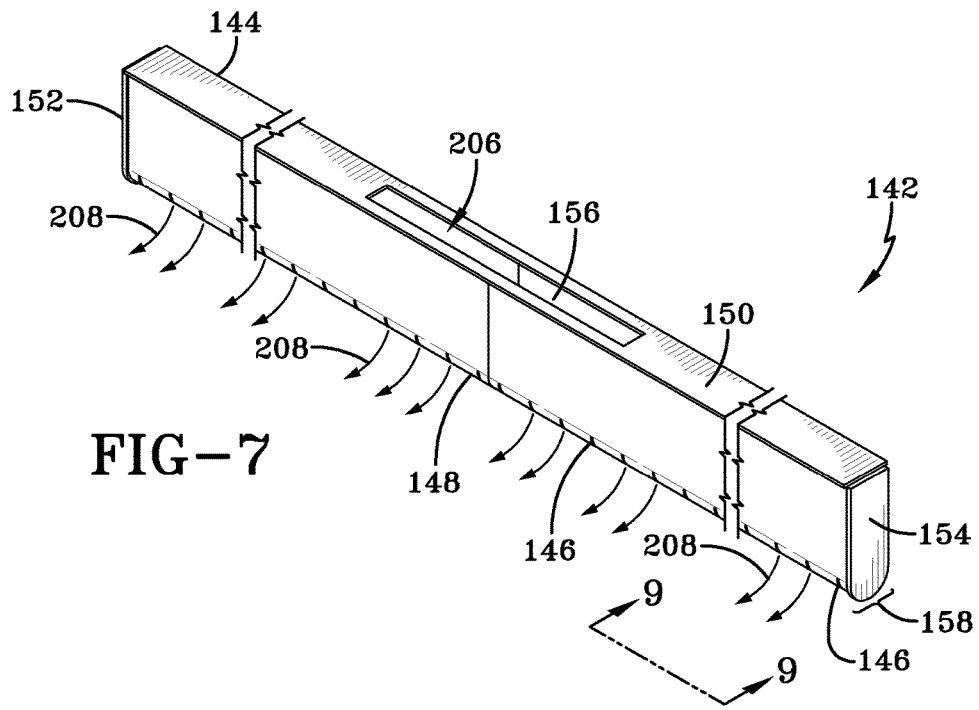
FIG. 7 shows an upper perspective of an exemplary embodiment of an enclosure.

FIG. 7 shows an exemplary embodiment of a distributor 142 that is configured to apply a fluid entering the distributor 142 onto a tube bundle in a similar manner as previously shown, such as FIG. 6B. Distributor 142 includes an enclosure 144 having an end 148 positioned to face a tube bundle (e.g., FIG. 6B) and an opposed end 150 facing away from the tube bundle. Distributor 142 also includes an inlet 156 formed in end 150 and extending between terminus 152 and opposed terminus 154. End 148 includes an end feature 158 with which at least one distribution device 146 or a plurality of distribution devices 146 is operatively associated. In one embodiment, distribution device 146 includes an opening 160 (FIG. 9) formed in end feature 158 of end 148. As a result of this arrangement, fluid 206 entering inlet 156 of enclosure 144, which may include a two-phase mixture of vapor and liquid, is distributed along the length of enclosure 144 and exits enclosure 144 via distribution device(s) 146 as distributed fluid 208. Due to the novel construction of enclosure 144, flow of distributed fluid 208 along the length of enclosure 144 is improved, i.e., directed to flow more uniformly along the length of the enclosure.

Figure 11:
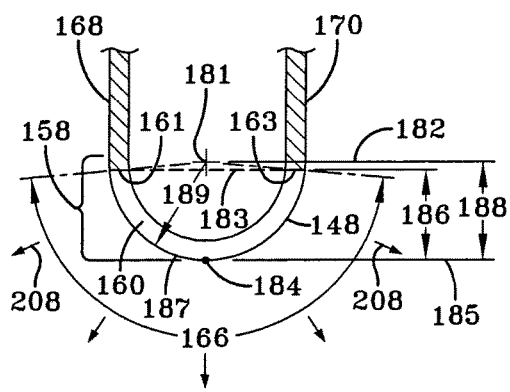
FIG. 11 shows a cross section of an exemplary embodiment of the enclosure taken along line 10-10 of FIG. 9.

It is to be understood that one, two or more distributors 142 can be used with a single tube bundle. In one embodiment, two or more distributors can have an overlapping spray angle 166 of distributed fluid 208 (FIG. 11). In one embodiment, a tube bundle can be divided into regions, such as vertically separated regions, with independent distributors. For example, for a large tube bundle divided into vertically separated regions, one or more distributors can be arranged between each region to provide improved, multi-level wetting of the tubes of the tube bundle.

While shown in FIGS. 7-10 as being assembled from multiple pieces, such as by welding, enclosure 144 can be extruded having a unitary or one-piece construction.

Figure 9:
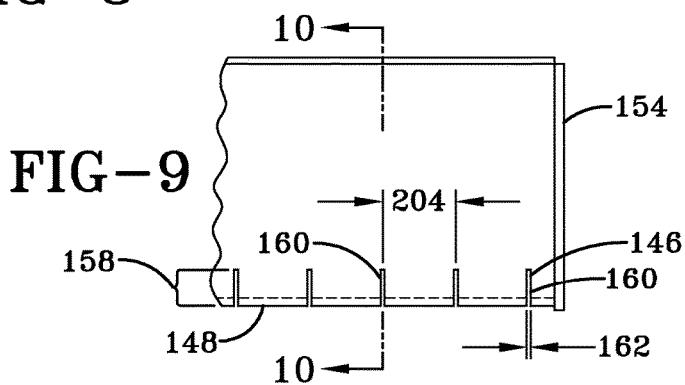
FIG. 9 shows a partial front view of the enclosure taken along line 9-9 of FIG. 7.
Figure 10:
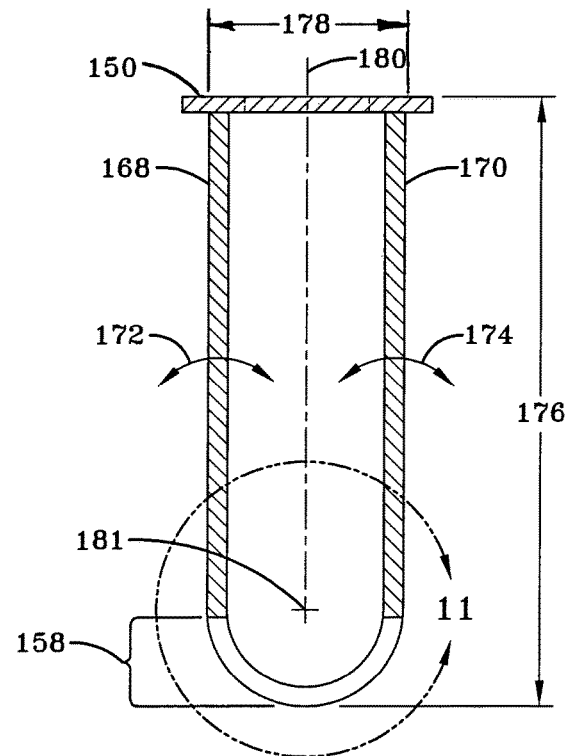
FIG. 10 shows a cross section of the enclosure taken along line 10-10 of FIG. 9.

FIG. 10 shows a cross section taken along line 10-10 of FIG. 9 that extends through an opening 160 formed in end feature 158 of end 148. End 148 extends to opposed enclosure portions 168, 170. As shown in FIG. 10, enclosure portions 168, 170 are parallel to each other and have a plane of symmetry 180 relative to each other. As further shown in FIG. 10, the enclosure has a height 176 and a width 178. The term aspect ratio of the enclosure refers to the height 176 divided by its width 178. The aspect ratio of the enclosure can range between about ½:1 and about 10:1, about ½:1 and about 8:1, about 2:1 and about 6:1, about 2:1 and about 4:1, about 2:1 and about 3:1, about 3:1 and about 8:1, about 4:1 and about 6:1, about 2:1, about 3:1, about 4:1 or any sub combination thereof. As a result of a properly sized aspect ratio, in combination with the size and spacing of openings 160, fluid flow through the openings 160 of enclosure can be optimized, i.e., made more uniform over the length of the enclosure over substantially an entire range of fluid pressures associated with operation of associated with operation of the distributor of the present disclosure.

Figure 8:
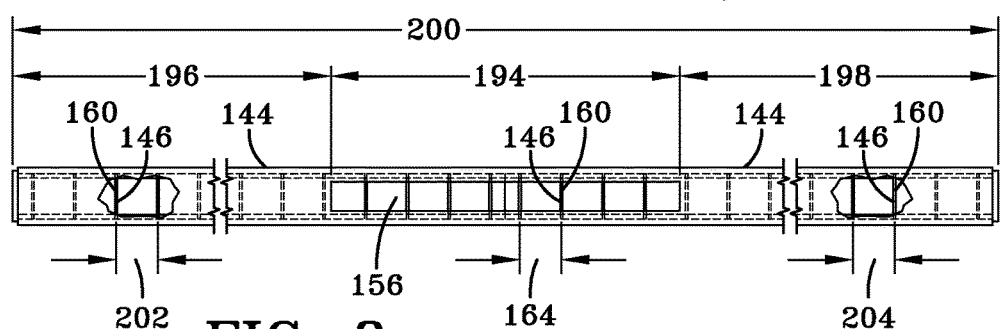
FIG. 8 shows a plan view of the enclosure of FIG. 7.

For example, as shown collectively in FIGS. 8-10, inlet 156 has a length 194 between about one sixth and one third of length 200. Inlet 156 is generally centered between opposed end portions 196, 198. In one embodiment, adjacent openings 160 formed in end feature 158 of end 148 have a substantially equal spacing 164 from each other along length 200. In another embodiment, spacing 164 between at least a portion of adjacent openings 160 associated with inlet 156 can be larger than spacing 202 between at least a portion of adjacent openings 160 associated with end portion 196 and/or can be larger than spacing 204 between at least a portion of adjacent openings 160 associated with the end portion 198, for promoting more uniform fluid flow through the collective openings 160 along length 200 of enclosure 144. In one embodiment, spacing 202 between at least a portion of adjacent openings 160 associated with end portion 196 can be substantially evenly spaced relative to spacing 204 between at least a portion of adjacent openings 160 associated with end portion 198. In one embodiment, openings 160 include a substantially uniform width 162. In one embodiment, the end of the kerf of openings 160 can be "squared off" or substantially rectangular, although in another embodiment the end of the kerf can be curved or a combination of curved and linear, in a similar manner as shown for end features 158, 258, 358, 458 in respective FIGS. 11-14, as will be discussed in further detail below. In another embodiment, openings 160 can have varying widths. Therefore, it is to be understood that the size of the openings 160 corresponds to a combination of distance 186 from an end of the kerf of opening 160 to a distal point of tangency 184 (FIG. 11) of the end feature 158 of the enclosure, also referred to as height, as well as width 162 (FIG. 10). That is, if widths 162 of openings 160 are substantially equal to each other, the size of openings 160 would be considered to be substantially equal if the height or distance 186 of the openings were also substantially equal. In one embodiment, where widths 162 of openings 160 are different from each other, then height or distance 186 of openings can be different from each other, but the size of the openings 160 can be substantially equal to each other, so long as the result is substantially uniform fluid flow along the length 200 (FIG. 8) of the enclosure. In one embodiment, at least two of openings 160 are substantially equal to each other or substantially evenly sized.

Although enclosure portions 168, 170 are shown in FIG. 10 as generally parallel, enclosure portion 168 can include an angular deviation 172, and/or enclosure portion 170 can include an angular deviation 174. As a result, enclosure portions 168, 170 can each deviate from between zero and about 45 degrees or any sub combination thereof from parallel relative to each other, resembling a "V" shape. In one embodiment, angular deviation 172 and/or angular deviation 174 can vary along the length of the enclosure, if desired.

FIG. 11, which is an enlarged view of region 11 of FIG. 10, shows further details of an exemplary end feature 158 of enclosure 144. As further shown in FIG. 11, feature 158 defines a curved or hemispherical profile having a radius or effective radius or radial distance 189 and extending to opposed enclosure portions 168, 170. In one embodiment, radius or effective radius or radial distance 189 can include one or more curves having different radii of curvature. Effective radius or radius or radial distance 189 extends outwardly from a center point or point of coincidence 181 that is coincident with a reference line 182 that is generally perpendicular to the opposed enclosure portions 168, 170. As shown in FIG. 10, enclosure portions 168, 170 are parallel to each other and have a plane of symmetry 180 relative to each other, and in one embodiment, plane of symmetry 180 is coincident with reference line 182. In one embodiment, point of coincidence 181 is not positioned in the center of enclosure 144. In one embodiment, the enclosure does not have a plane of symmetry. Opening 160 includes edges 161, 163 that are associated with the ends of the kerf associated with opening 160, with edge 161 associated with and in close proximity to enclosure portion 168, and edge 163 associated with and in close proximity to enclosure portion 170. As further shown in FIG. 11, a reference line 183 is generally perpendicular to opposed enclosure portions 168, 170 and extending through edges 161, 163. Reference line 182 is parallel to reference line 183. A distal portion 187 of end feature 158 of end 148 relative to enclosure portions 168, 170 includes a distal point of tangency 184 that is coincident with a reference line 185 which is mutually parallel to reference lines 182, 183. The spacing or effective spacing between edges 161, 163 of opening 160 and point of tangency 184 of distal portion 187 of end feature 158 as measured along reference line 185 yields a distance 186. The spacing between reference line 182 that extends through point of coincidence 181 and distal point of tangency 184, as measured along the reference line 185, yields a distance 188. Distance 188 is greater than distance 186. That is, the radius or effective radius or radial distance 189 associated with a distal tangential portion, such as point of tangency 184 of end feature 158 (distance 188) is greater than an effective spacing or spacing between edges 161, 163 associated with a distal tangential portion, such as point of tangency 184 (distance 186). As a result, distributed fluid flowing through openings 160 is constrained to a spray angle 166 of between about 60 degrees and about 180 degrees, between about 90 degrees and about 180 degrees, between about 120 degrees and about 180 degrees, between about 150 degrees and about 180 degrees, between about 160 degrees and about 180 degrees, between about 160 degrees and about 170 degrees, between about 160 degrees and about 165 degrees, about 160 degrees, about 165 degrees, and about 170 degrees, which spray angle 166 remaining relatively constant over substantially an entire range of fluid pressures associated with operation of the distributor of a vapor compression system.

Figure 12:
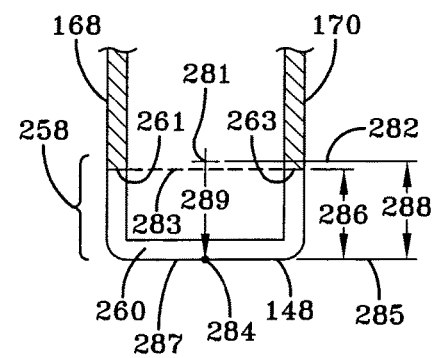
FIG. 12 shows a cross section of a further exemplary embodiment of the enclosure taken along line 10-10 of FIG. 9.

FIG. 12, which is an enlarged view of a region similar to region 11 of FIG. 10, shows further details of an exemplary end feature 258 of enclosure 144. As further shown in FIG. 12, feature 258 defines a squared off or rectangular profile comprised of linear segments of the enclosure having an effective radius or effective radial distance 289 and extending to opposed enclosure portions 168, 170. Effective radius or effective radial distance 289 extends outwardly from a center point or point of coincidence 281 that is coincident with a reference line 282 that is generally perpendicular to the opposed enclosure portions 168, 170. In one embodiment, point of coincidence 281 is not positioned in the center of enclosure 144. In one embodiment, the enclosure does not have a plane of symmetry. Opening 260 includes edges 261, 263 that are associated with the ends of the kerf associated with opening 260, with edge 261 associated with and in close proximity to enclosure portion 168, and edge 263 associated with and in close proximity to enclosure portion 170. As further shown in FIG. 12, a reference line 283 is generally perpendicular to opposed enclosure portions 168, 170 and extending through edges 261, 263. Reference line 282 is parallel to reference line 283. A distal portion 287 of end feature 258 of end 148 relative to enclosure portions 168, 170 includes a distal point of tangency 284 that is coincident with a reference line 285 which is mutually parallel to reference lines 282, 283. The spacing or effective spacing between edges 261, 263 of opening 260 and point of tangency 284 of distal portion 287 of end feature 258 as measured along reference line 285 yields a distance 286. The spacing between reference line 282 that extends through point of coincidence 281 and distal point of tangency 284, as measured along the reference line 285, yields a distance 288. Distance 288 is greater than distance 286. That is, the effective radius or effective radial distance 289 associated with a distal tangential portion, such as point of tangency 284 of end feature 258 (distance 288) is greater than an effective spacing or spacing between edges 261, 263 associated with distal tangential portion, such as point of tangency 284 (distance 286). As a result, distributed fluid flowing through openings 260 is constrained to a spray angle 166 (FIG. 11) of between about 60 degrees and about 180 degrees, between about 90 degrees and about 180 degrees, between about 120 degrees and about 180 degrees, between about 150 degrees and about 180 degrees, between about 160 degrees and about 180 degrees, between about 160 degrees and about 170 degrees, between about 160 degrees and about 165 degrees, about 160 degrees, about 165 degrees, and about 170 degrees, which spray angle 166 remaining relatively constant over substantially an entire range of fluid pressures associated with operation of the distributor of a vapor compression system.

Figure 13:
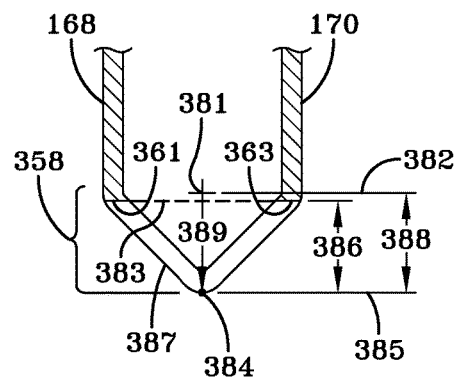
FIG. 13 shows a cross section of a further exemplary embodiment of the enclosure taken along line 10-10 of FIG. 9.

FIG. 13, which is an enlarged view of a region similar to region 11 of FIG. 10, shows further details of an exemplary end feature 358 of enclosure 144. As further shown in FIG. 13, end feature 358 defines a "V" profile comprised of linear segments of the enclosure having an effective radius or effective radial distance 389 and extending to opposed enclosure portions 168, 170. Effective radius or effective radial distance 389 extends outwardly from a center point or point of coincidence 381 that is coincident with a reference line 382 that is generally perpendicular to the opposed enclosure portions 168, 170. In one embodiment, point of coincidence 381 is not positioned in the center of enclosure 144. In one embodiment, the enclosure does not have a plane of symmetry. Opening 360 includes edges 361, 363 that are associated with the ends of the kerf associated with opening 360, with edge 361 associated with and in close proximity to enclosure portion 168, and edge 363 associated with and in close proximity to enclosure portion 170. As further shown in FIG. 13, a reference line 383 is generally perpendicular to opposed enclosure portions 168, 170 and extending through edges 361, 363. Reference line 382 is parallel to reference line 383. A distal portion 387 of end feature 358 of end 148 relative to enclosure portions 168, 170 includes a distal point of tangency 384 that is coincident with a reference line 385 which is mutually parallel to reference lines 382, 383. The spacing or effective spacing between edges 361, 363 of opening 360 and point of tangency 384 of distal portion 387 of end feature 358 as measured along reference line 385 yields a distance 386. The spacing between reference line 382 that extends through point of coincidence 381 and distal point of tangency 384, as measured along the reference line 385, yields a distance 388. Distance 388 is greater than distance 386. That is, the effective radius or effective radial distance 389 associated with a distal tangential portion, such as point of tangency 384 of end feature 358 (distance 388) is greater than an effective spacing or spacing between edges 361, 363 associated with distal tangential portion, such as point of tangency 384 (distance 386). As a result, distributed fluid flowing through openings 360 is constrained to a spray angle 166 (FIG. 11) of between about 60 degrees and about 180 degrees, between about 90 degrees and about 180 degrees, between about 120 degrees and about 180 degrees, between about 150 degrees and about 180 degrees, between about 160 degrees and about 180 degrees, between about 160 degrees and about 170 degrees, between about 160 degrees and about 165 degrees, about 160 degrees, about 165 degrees, and about 170 degrees, which spray angle 166 remaining relatively constant over substantially an entire range of fluid pressures associated with operation of the distributor of a vapor compression system.

Figure 14:
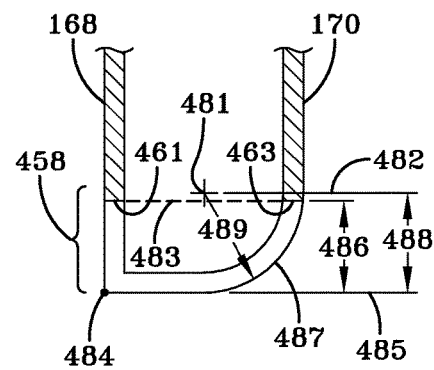
FIG. 14 shows a cross section of yet a further exemplary embodiment of the enclosure taken along line 10-10 of FIG. 9.

FIG. 14, which is an enlarged view of a region similar to region 11 of FIG. 10, shows further details of an exemplary end feature 458 of enclosure 144. As further shown in FIG. 14, feature 458 defines a lower portion of a "D" profile comprised of a combination of linear and curved segments of the enclosure having an effective radius or effective radial distance 489 and extending to opposed enclosure portions 168, 170. In one embodiment, different arrangements or profiles of curved segments and linear segments can be used. Effective radius or effective radial distance 489 extends outwardly from a center point or point of coincidence 481 that is coincident with a reference line 482 that is generally perpendicular to the opposed enclosure portions 168, 170. In one embodiment, point of coincidence 481 is not positioned in the center of enclosure 144. In one embodiment, the enclosure does not have a plane of symmetry. Opening 460 includes edges 461, 463 that are associated with the ends of the kerf associated with opening 460, with edge 461 associated with and in close proximity to enclosure portion 168, and edge 463 associated with and in close proximity to enclosure portion 170. As further shown in FIG. 13, a reference line 483 is generally perpendicular to opposed enclosure portions 168, 170 and extending through edges 461, 463. Reference line 482 is parallel to reference line 483. A distal portion 487 of end feature 458 of end 148 relative to enclosure portions 168, 170 includes a distal point of tangency 484 that is coincident with a reference line 485 which is mutually parallel to reference lines 482, 483. The spacing or effective spacing between edges 461, 463 of opening 460 and point of tangency 484 of distal portion 487 of end feature 458 as measured along reference line 485 yields a distance 486. The spacing between reference line 482 that extends through point of coincidence 481 and distal point of tangency 484, as measured along the reference line 485, yields a distance 488. Distance 488 is greater than distance 486. That is, the effective radius or effective radial distance 489 associated with a distal tangential portion, such as point of tangency 484 of end feature 458 (distance 488) is greater than an effective spacing or spacing between edges 461, 463 associated with a distal tangential portion, such as point of tangency 484 (distance 486). As a result, distributed fluid flowing through openings 460 is constrained to a spray angle 166 (FIG. 11) of between about 60 degrees and about 180 degrees, between about 90 degrees and about 180 degrees, between about 120 degrees and about 180 degrees, between about 150 degrees and about 180 degrees, between about 160 degrees and about 180 degrees, between about 160 degrees and about 170 degrees, between about 160 degrees and about 165 degrees, about 160 degrees, about 165 degrees, and about 170 degrees, which spray angle 166 remaining relatively constant over substantially an entire range of fluid pressures associated with operation of the distributor of a vapor compression system.

It is to be understood that lines 183, 283, 383, 483 associated with respective distances 186, 286, 386, 486 are not constrained to extend through each of respective edges 161 and 163, 261 and 263, 361 and 363, 461 and 463 of respective opening 160, 260, 360, 460. For example, in one embodiment, edges 161 and 163 of opening 160 can be offset relative to line 183, such that line 183 represents an average distance 186 between corresponding edges 161, 163. However, lines 183, 283, 383, 483 and corresponding respective distances 186, 286, 386, 486 to respective points of tangency 184, 284, 384, 484 are less than corresponding respective distances 188, 288, 388, 488 between lines 182, 282, 382, 482 and corresponding respective distances 188, 288, 388, 488 to respective points of tangency 184, 284, 384, 484, in order to ensure a consistent, controlled spray angle 166 (FIG. 11) of distributed fluid flow, for reasons previously described above.

Figure 15:
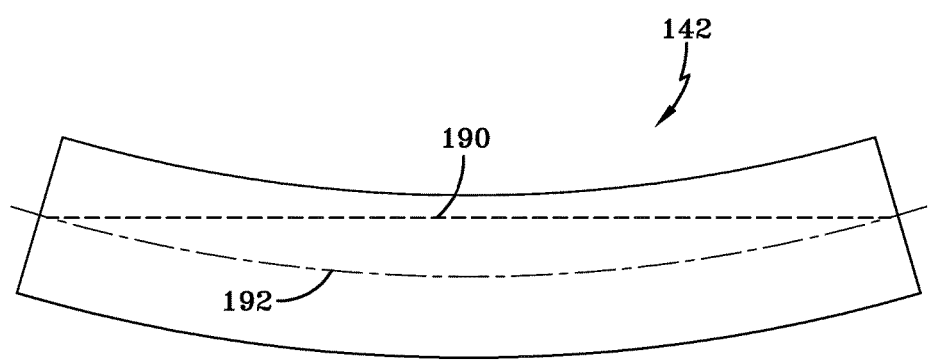
FIG. 15 shows an exemplary embodiment of the enclosure.

FIG. 15 shows an exemplary embodiment of distributor 142 having an axis 192 that is curved, in contrast with a linear axis 190, which can provide improved fluid distribution over some tube bundle arrangements as compared to a distributor having a straight or linear axis, such as in combination with differently configured openings 160 (FIG. 8).

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation-specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A distributor for use in a vapor compression system comprising:
   an enclosure defining an enclosed volume, wherein the enclosure is configured to be positioned in a heat exchanger having a tube bundle comprising a plurality of tubes extending horizontally in the heat exchanger, wherein the enclosure comprises first and second longitudinal ends, two planar walls extending between the longitudinal ends, a curved end portion extending between the longitudinal ends and connected between first ends of the planar walls, and an end wall extending between the longitudinal ends and connected to second ends of the planar walls, opposite the first ends, wherein the curved end portion faces the tube bundle and the end wall faces away from the tube bundle;
   an inlet formed in the end wall and evenly spaced between the longitudinal ends of the enclosure, the inlet having a length between one sixth and one third of a length of the enclosure, and the inlet configured to receive a fluid into the enclosure;
   wherein a first longitudinal extent of the enclosure is defined by the length of the inlet, a second longitudinal extent of the enclosure is defined between the first longitudinal extent and one of the longitudinal ends, and a third longitudinal extent of the enclosure is defined between the first longitudinal extent and the other longitudinal end;
   wherein each of the longitudinal extents includes a plurality of slots formed through the curved end portion, and each of the slots is configured as an arc providing a spray angle of between 60 degrees and 180 degrees; and
   wherein the slots formed in the first longitudinal extent are evenly spaced from one another by a first distance, and the slots formed in the respective second and third longitudinal extents are evenly spaced from one another by a distance less than the first distance.

2. The distributor of claim 1, wherein the enclosure has an aspect ratio of height to width between 2:1 and 6:1.

3. The distributor of claim 1, wherein the planar walls are disposed between zero degrees and 45 degrees from parallel to each other.

4. The distributor of claim 1, wherein the planar walls are disposed parallel to each other.

5. The distributor of claim 1, wherein the enclosure has an aspect ratio of height to width between 2:1 and 4:1.

6. The distributor of claim 1, wherein the enclosure has a 2:1 aspect ratio of height to width.

7. The distributor of claim 1, wherein the enclosure has a 4:1 aspect ratio of height to width.

8. The distributor of claim 1, wherein the spray angle is between 160 degrees and 170 degrees.

9. The distributor of claim 1, wherein the spray angle is 165 degrees.

10. The distributor of claim 1, wherein each of the slots is evenly sized.

11. A method for using the distributor according to claim 1, the method comprising:
 operating the vapor compression system; and
 spraying the fluid onto an exterior of the tubes.

* * * * *